FIG.2

Jan. 26, 1965  E. R. ALLER  3,167,359
APPARATUS FOR STORING GRANULAR MATERIAL
Filed May 14, 1962  4 Sheets-Sheet 3

FIG. 3

INVENTOR.
EDMUND R. ALLER
BY
Prangley, Baird, Clayton,
Miller & Vogel,  ATTYS.

United States Patent Office 3,167,359
Patented Jan. 26, 1965

3,167,359
APPARATUS FOR STORING GRANULAR
MATERIAL
Edmund R. Aller, Gary, Ind., assignor to General American Transportation Corporation, Chicago, Ill., a corporation of New York
Filed May 14, 1962, Ser. No. 194,593
5 Claims. (Cl. 302—27)

The present invention relates to apparatus for storing granular material, and more particularly to such apparatus including structure defining a plurality of storage hoppers and an improved system for selectively controlling the unloading of the granular material from the various ones of the storage hoppers either upon an automatic basis or upon a manual basis.

Another object of the invention is to provide storage apparatus of the character described, and further including a remote control station and facility controllable from the station mentioned for selectively governing the particular ones of the storage hoppers from which the granular material is to be unloaded.

A still further object of the invention is to provide in storage apparatus of the character described, an improved and simplified electrical control system for governing from a remote control station the particular ones of the storage hoppers from which the granular material is to be unloaded.

A still further object of the invention is to provide in storage apparatus of the character described, an improved automatic control arrangement for selectively governing the particular ones of the storage hoppers from which the granular material is to be unloaded.

Further features of the invention pertain to the particular arrangement of the elements of the storage apparatus, whereby the above-outlined and additional operating features thereof are attained.

The invention, both as to its organization and method of operation, together with further objects and advantages thereof, will best be understood by reference to the following specification, taken in connection with the accompanying drawings, in which.

Figure 1:
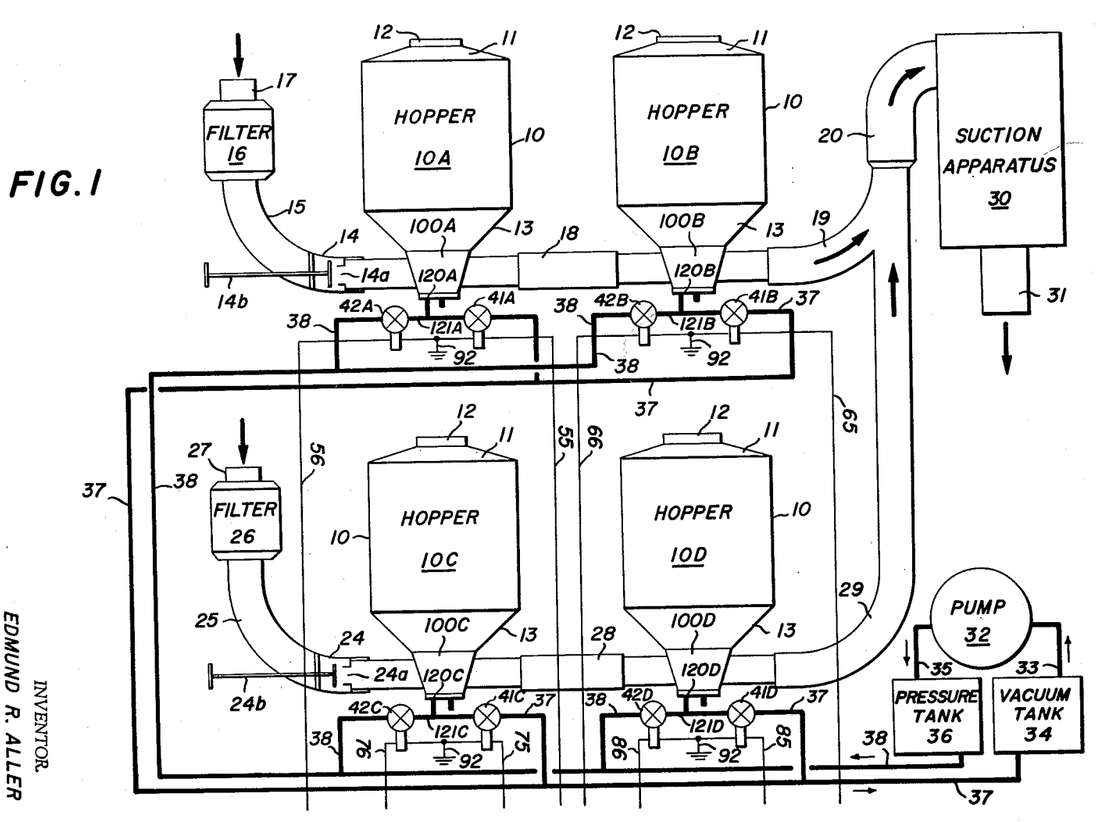
FIGURES 1 and 2, taken together, are a diagrammatic illustration of apparatus for storing granular material and embodying the present invention and including structure defining a plurality of storage hoppers, a corresponding plurality of unloading nozzles respectively carried by the storage hoppers, and a control arrangements for selectively governing the unloading nozzles so as to control the particular ones of the storage hoppers from which the granular material is to be unloaded.
Figure 2:
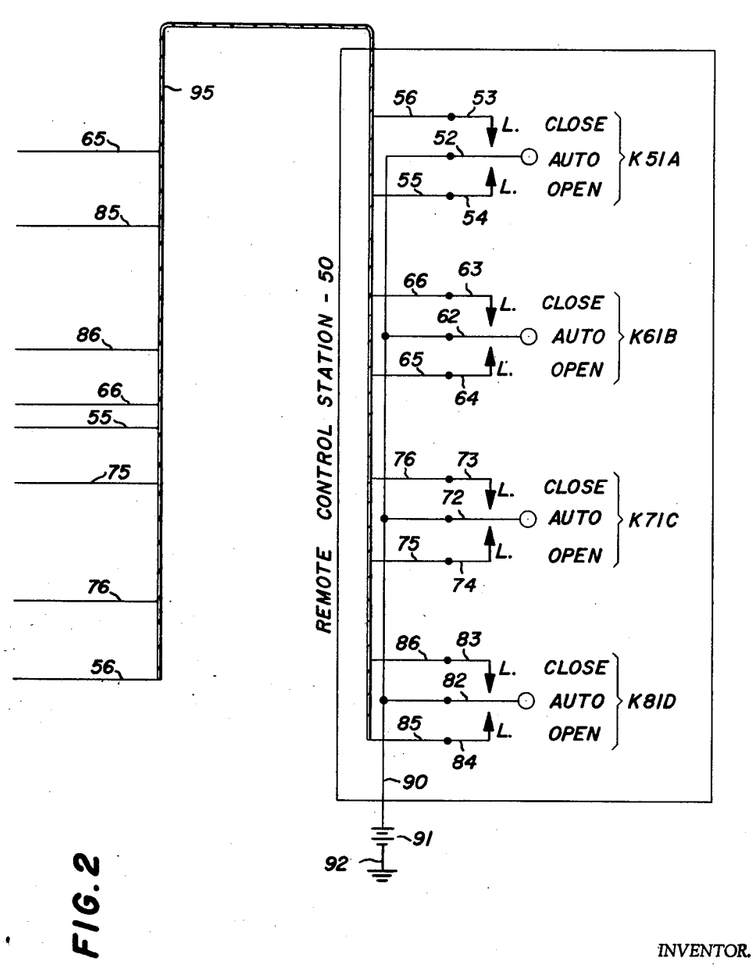
Figure 3:
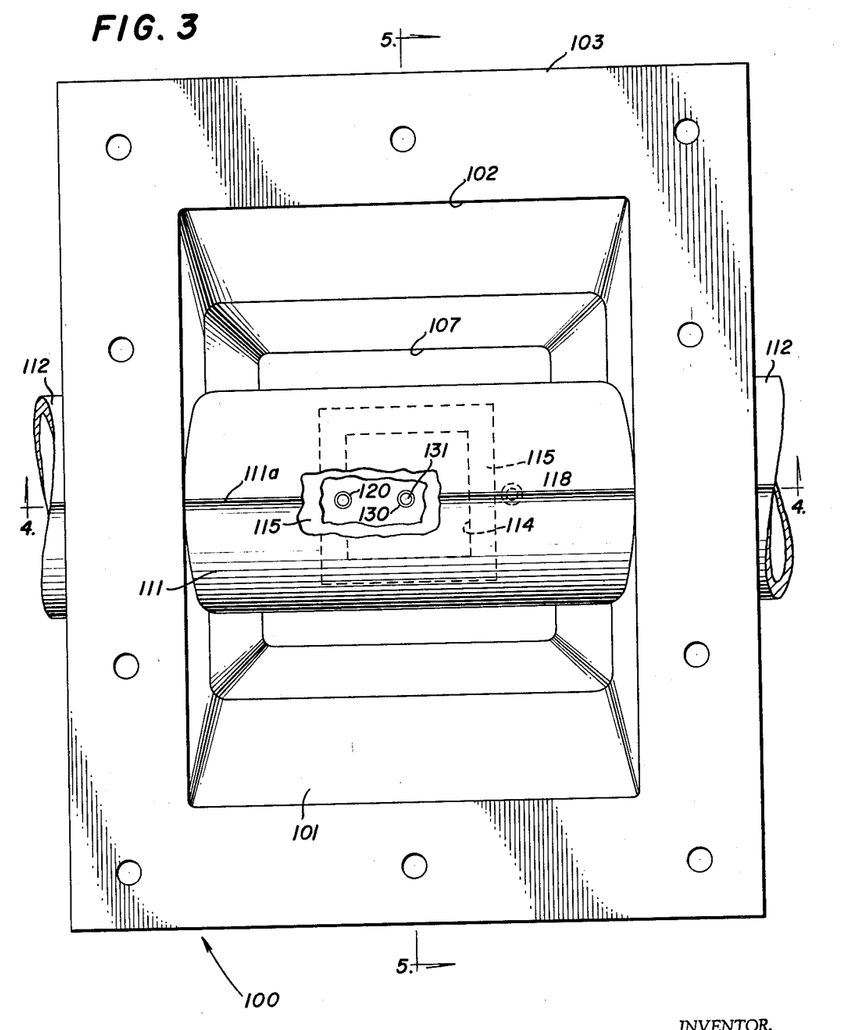
FIG. 3 is a fragmentary plan view of one of the unloading nozzles that is incorporated in the storage apparatus.

Referring now to FIGS. 1 and 2 of the drawings, the apparatus for storing granular material there illustrated, and embodying the features of the present invention, comprises a plurality of storage hoppers, four of the hoppers 10A, 10B, 10C and 10D being shown for the purpose of the present description. The hoppers 10A, etc., are especially adapted for storing such finely divided or granular material, as flour, malt, plastic resin beads, or the like. Preferably, the hoppers 10A, etc., are identical; whereby the hopper 10A comprises an upstanding substantially cylindrical body 10 provided with substantially frusto-conical top and bottom walls 11 and 13, respectively. The top wall 11 is provided with a loading hatch opening that is normally closed by an associated hatch cover 12; and the bottom wall 13 is provided with an associated bottom discharge outlet. A plurality of outlet nozzles are respectively carried by the bottom walls of the hoppers; whereby the outlet nozzles 100A, 100B, 100C and 100D are respectively carried by the bottom walls 13 of the hoppers 10A, 10B, 10C and 10D.

The nozzles 100A, etc., are identical to each other; and each of these nozzles is of the fundamental construction and arrangement of that disclosed in the copending application of Edmund R. Aller, Serial No. 140,936, filed September 26, 1961, now Patent No. 3,088,777, granted May 7, 1963, and described more fully hereinafter. More particularly, each of the nozzles 100A, etc., is of the automatic type; whereby the same essentially comprises a casing communicating with the bottom discharge outlet in the bottom wall 13 of the associated hopper 10A, etc., a suction tube extending through the casing and having a valve port therein, and valve mechanism for selectively controlling the opening and the closing of the valve port mentioned.

The hoppers 10A and 10B are arranged in a first group and are connected to an outlet conduit 19; and the hoppers 10C and 10D are arranged in a second group and are connected to an outlet conduit 29. Also the storage apparatus comprises suction apparatus 30 common to the four hoppers 10A, etc., and an air filter 16 common to the first group of hoppers 10A and 10B, and an air filter 26 common to the second group of hoppers 10C and 10D. In the arrangement, the air filter 16 is provided with an air inlet conduit 17 communicating with the atmosphere, and an air outlet conduit 15 that is connected to the inlet of an associated air control valve 14, the outlet of the valve 14 being connected to the inlet of the suction tube of the nozzle 100A. Similarly, the air filter 26 is provided with an air inlet conduit 27 communicating with the atmosphere, and an air outlet conduit 25 that is connected to the inlet of an associated air control valve 24, the outlet of the valve 24 being connected to the inlet of the suction tube of the nozzle 100C. The valve 14 comprises adjustable port control mechanism 14a that may be selectively adjusted from the exterior by an associated manually rotatable rod 14b; and likewise, the valve 24 comprises adjustable port control mechanism 24a that may be selectively adjusted from the exterior by an associated manually rotatable rod 24b. The outlet of the suction tube of the nozzle 100A is connected via a conduit 18 to the inlet of the suction tube of the nozzle 100B, and the outlet of the suction tube of the nozzle 100B is connected to the outlet conduit 19; and likewise, the outlet of the suction tube of the nozzle 100C is connected via a conduit 28 to the inlet of the suction tube of the nozzle 100D, and the outlet of the suction tube of the nozzle 100D is connected to the outlet conduit 29. The two outlet conduits 19 and 29 are connected in parallel to a common outlet conduit 20 that is connected to the suction inlet of the suction apparatus 30; and the discharge outlet of the suction apparatus 30 is connected to a discharge conduit 31.

In each of the nozzles 100A, etc., the valve mechanism has a normal open position placing the casing thereof into communication with the suction tube thereof, thereby to accommodate the unloading of the granular material from the associated hopper 10A, etc.; and the valve mechanism has an operated closed position cutting-off communication between the casing thereof and the suction tube thereof, thereby to prevent unloading of the granular material from the associated hopper 10A, etc. Moreover, each of the nozzles 100A, etc., comprises automatic facility for actuating the valve mechanism thereof from its normal open position into its operated closed position in response to the emptying of all of the granular material from the associated one of the hoppers 10A, etc.; which facility is described in detail subsequently. Further, each of the nozzles 100A, etc., comprises first manually controllable facility for overriding its automatic facility and for forcing the valve mechanism thereof into its open position, and second manually controllable facility for overriding its automatic facility and for forcing the valve mechanism thereof into its closed position; which facilities are described in detail subsequently.

Also, the storage apparatus comprises control equipment for selectively operating the valve mechanisms of the nozzles 100A, etc., between their open and closed positions; which equipment includes an air pump 32, a vacuum tank 34, a pressure tank 33, a plurality of opening valves 41A, 41B, 41C and 41D respectively associated with the casings of the nozzles 100A, 100B, 100C and 100D, and a plurality of closing valves 42A, 42B, 42C and 42D respectively associated with the casings of the nozzles 100A, 100B, 100C and 100D. More particularly, the inlet of the pump 32 is connected by a pipe 33 to the vacuum tank 34 and the outlet of the pump 32 is connected by a pipe 35 to the pressure tank 36; whereby operation of the pump 32 maintains a subatmospheric or low pressure in the vacuum tank 34 and a superatmospheric or high pressure in the pressure tank 36. The vacuum tank 34 is connected to a low pressure line 37 extending to the casings of the nozzles 100A, etc.; and the pressure tank 36 is connected to a high pressure line 38 extending to the casings of the nozzles 100A, etc. The low pressure line 37 is respectively connected by the opening valves 41A, 41B, 41C and 41D to the casings of the respective nozzles 100A, 100B, 100C and 100D; and similarly, the high pressure line 38 is respectively connected by the closing valves 42A, 42B, 42C and 42D to the casings of the respective nozzles 100A, 100B, 100C and 100D. The opening valves 41A, etc., and the closing valves 41B, etc., are identical; whereby each of the valves is normally biased into its closed position and is provided with an operating solenoid which when energized actuates the valve against its bias into its open position. Operation of the opening valve 41A, etc., into its open position connects the low pressure pipe 37 to the casing of the corresponding nozzle 100A, etc.; whereby the valve mechanism of the nozzle 100A, etc., is actuated into its open position overriding the automatic facility therein, as previously noted. Operation of the closing valve 42A, etc., into its open position connects the high pressure pipe 38 to the casing of the corresponding nozzle 100A, etc.; whereby the valve mechanism of the nozzle 100A, etc., is actuated into its closed position overriding the automatic facility therein, as previously noted. Only one of the pair of valves 41A, 42A can be operated into its open position at any time and operation of both of the valves 41A and 42A into their closed positions restores the automatic facility in the corresponding nozzle 100A. The arrangements of the other pairs of valves 41B, 42B and 41C, 42C and 41D, 42D are the same as that described above for the pair of valves 41A, 42A.

Finally, the storage apparatus comprises a remote control station 50 that is connected by an electric cable 95 to the solenoids of the opening valves 41A, etc., and to the solenoids of the closing valves 42A, etc.; which station 50 is remote from the locality of the hoppers 10A, etc., and comprises a plurality of control keys or switches K51A, K61B, K71C and K81D respectively corresponding to the hoppers 10A, 10B, 10C and 10D. More particularly, each of the keys K51A, etc., is of the manually operable type including an "automatic" position, an "open" position and a "closed" position. For example, the key K51A comprises a movable switch spring 52 and two stationary switch springs 53 and 54 respectively disposed on opposite sides thereof; whereby the movable switch spring 52 disengages both of the stationary switch springs 53 and 54 in the "automatic" position thereof; whereby the movable switch spring 52 engages the stationary switch 54 in the "open" position thereof; and whereby the movable switch spring 52 engages the stationary switch spring 53 in the "closed" position thereof. Also, the movable switch spring 52 is locked in either its "open" position or its "closed" position when it is operated thereto, and until the same is manually operated back to its "automatic" position. The construction and arrangement of each of the other keys K61B, K71C and K81D are the same as those of the key K51A; whereby the key K61B comprises the corresponding switch springs 62, 63 and 64; whereby the key K71C comprises the corresponding switch springs 72, 73 and 74; and whereby the key K81D comprises the corresponding switch springs 82, 83 and 84.

In the circuit arrangement, the switch springs 54, 64, 74 and 84 are respectively connected to the conductors 55, 65, 75 and 85 included in the cable 95 and respectively extending to the solenoids of the respective opening valves 41A, 41B, 41C and 41D; and similarly, the switch springs 53, 63, 73 and 83 are respectively connected to the conductors 56, 66, 76 and 86 included in the cable 95 and respectively extending to the solenoids of the respective closing valves 42A, 42B, 42C and 42D. Also the switch springs 52, 62, 72 and 82 are commonly connected to a bus 90 that is connected to the positive terminal of a storage battery 91 arranged at the station 50, the negative terminal of the battery 91 being connected to a grounded conductor 92. The conductors 55 and 56 are respectively connected to two terminals of the solenoids of the two valves 41A and 42A; and the other two terminals of the two solenoids mentioned are commonly connected to the grounded conductor 92. Similarly, the conductors 65 and 66 are respectively connected to two terminals of the solenoids of the two valves 41B and 42B; and the other two terminals of the two solenoids mentioned are commonly connected to the grounded conductor 92. Similarly, the conductors 75 and 76 are respectively connected to two terminals of the solenoids of the two valves 41C and 42C; and the other two terminals of the two solenoids mentioned are commonly connected to the grounded conductor 92. Similarly, the conductors 85 and 86 are respectively connected to two terminals of the solenoids of the two valves 41D and 42D; and the other two terminals of the two solenoids mentioned are commonly connected to the grounded conductor 92.

Before proceeding with the description of the operation of the storage apparatus of FIGS. 1 and 2, it is well to consider the construction and arrangement of the nozzles 100A, etc.; whereby reference is made to FIGS. 4 to 7, inclusive, wherein the construction and arrangement of the nozzle 100 is illustrated. The nozzle 100 corresponds to any one of the nozzles 100A, 100B, etc., as previously described generally; whereby the nozzle 100 comprises a hollow casing 101 terminating in an open top 102 that is surrounded by an outwardly directed substantially rectangular collar 103 that is adapted to be removably secured in place below the substantially rectangular collar 13a carried by the bottom wall 13 of a storage hopper 10 and disposed in surrounding relation with respect to the bottom discharge outlet 13b therein. More particularly, the collar 103 is arranged immediately below the collar 13a with a sealing gasket 104 therebetween and is secured in place by a plurality of bolts 105 projecting through aligned openings respectively formed in the collars 13a and 103 and in the gasket 104 and respectively carrying cooperating nuts 106. Also, the casing 101 terminates in a bottom opening 107 disposed directly below the top opening 102; which bottom opening 107 is normally closed by an associated removable bottom cover 108. The cover 108 is normally retained in place by a pair of threaded studs 109 respectively carrying a pair of cooperating nuts 110. The inner ends of the studs 109 are respectively received in a cooperating pair of threaded openings provided in the bottom of the casing 101 and the intermediate portions of the studs 109 respectively project through cooperating openings provided in the bottom cover 108, the outer ends of the threaded studs 109 respectively receiving the nuts 110.

Figures 4, 5, 6:
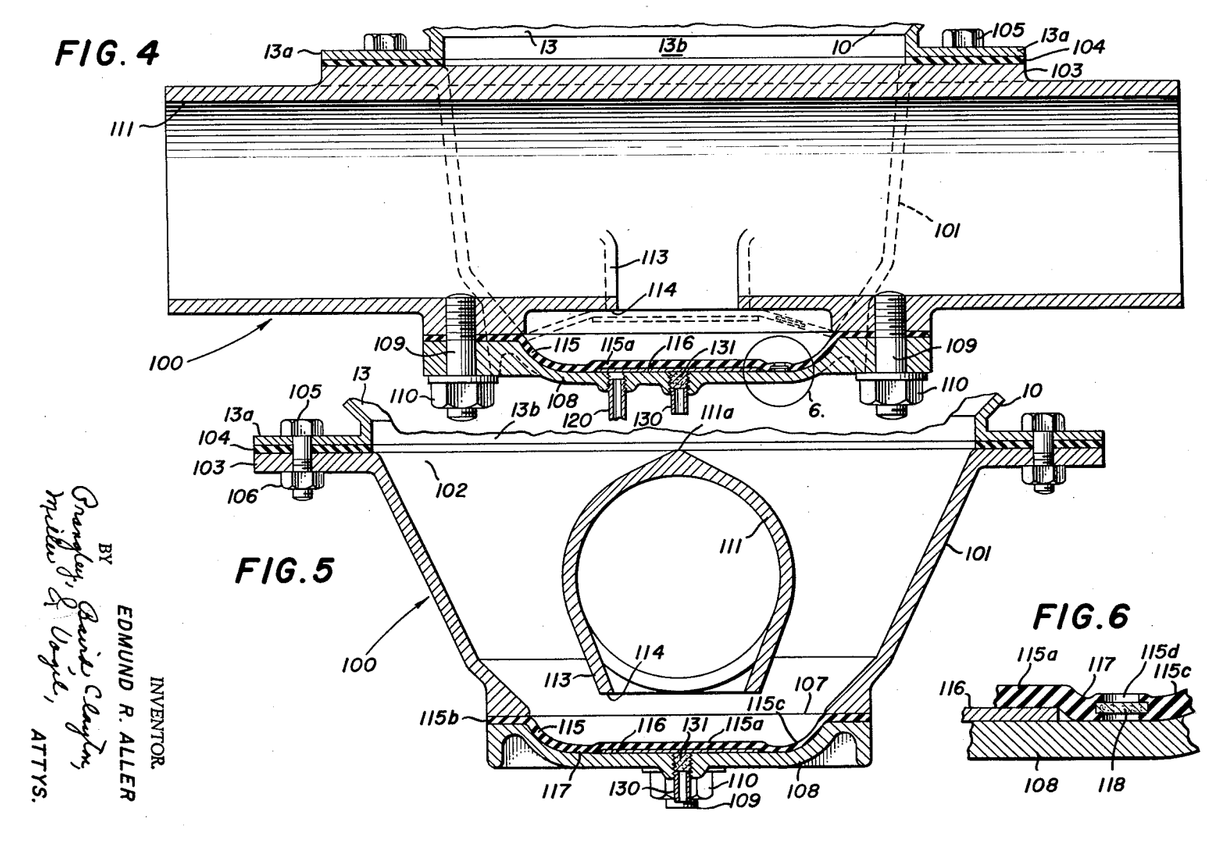
FIG. 4 is a longitudinal sectional view of the unloading nozzle, taken in the direction of the arrows along the line 4—4 in FIG. 3.
FIG. 5 is a lateral sectional view of the unloading nozzle, taken in the direction of the arrows along the line 5—5 in FIG. 3.
FIG. 6 is a greatly enlarged fragmentary sectional view of a constructional detail of the unloading nozzle, taken within the circle designated "6" in FIG. 4, and illustrating a porous plug that is arranged in the diaphragm incorporated therein.

Further, the nozzle 100 comprises a suction tube 111 extending longitudinally therethrough and formed integrally with the casing 101; and preferably, the casing 101 and the suction tube 111 comprise an integral metal casting formed of a suitable aluminum alloy. The suction tube 111 is disposed below the rectangular collar 103 carried by the top of the casing 101 and the opposite ends 112 thereof extend well outwardly beyond the collar 103. Both of the ends 112 are open, and one of them is adapted to serve as an air inlet opening into the suction tube 111, and the other of them is adapted to serve as an air outlet opening from the suction tube 111. The intermediate section of the suction tube 111 is disposed within the casing 101 and carries at the bottom thereof a communicating downwardly directed hood 113 terminating at the bottom thereof in a valve port 114 positioned directly above the bottom discharge opening 107 into the casing 101.

Also a diaphragm 115 is arranged in the lower portion of the casing 101, and more particularly between the bottom of the casing 101 and the bottom cover 108. Specifically, the diaphragm 115 comprises a centrally disposed section 115a constituting a valve element with respect to the associated valve port 114, an outer marginal section 115b constituting a gasket element disposed between the bottom of the casing 101 and the top of the bottom cover 108, and a substantially annular intermediate section 115c constituting a flexible diaphragm proper element interconnecting the sections 115a and 115b. More particularly, the diaphragm 115 may be formed of a suitable sheet of rubber, or the like, and is arranged in covering relation with respect to the bottom discharge opening 107, the gasket element 115b thereof being clamped in place by the bottom cover 108 upon the bottom of the casing 101 in surrounding relation with the bottom discharge opening 107. Also, a metal reinforcing plate 116 is arranged below the lower side of the valve element 115a and the adjacent upper side of the bottom wall of the bottom cover 108; which metal reinforcing plate 116 is securely adhered to the adjacent lower surface of the valve element 115a for the purpose of preventing ballooning thereof into the bottom of the hood 113 through the valve port 114, when the valve element 115a occupies its closed position with respect to the valve port 114, as explained more fully hereinafter.

Also, the diaphragm 115 cooperates with the bottom cover 108 to define a chamber 117 therebetween; which chamber 117 communicates with the lower portion of the casing 101 adjacent to the bottom discharge opening 107 via a restricted passage formed through the diaphragm proper element 115c. As best illustrated in FIGS. 4 and 6, a hole 115d is formed through the diaphragm proper element 115c and located well outwardly from both the valve port 114 and the valve element 115a and positioned below the bottom of the intermediate section of the suction tube 111 disposed within the casing 101; and arranged within the hole 115d is a button-like plug 118 formed of porous material thereby to define the previously mentioned restricted passage between the lower portion of the casing 101 and the chamber 117 disposed below the diaphragm 115. More specifically, the button-like plug 118 may be formed of porous material selected from the class consisting of ceramic materials, plastic materials, and sintered metal oxide materials.

In view of the foregoing, it will be understood that the interior of the storage hopper 10 is in communication through the bottom discharge outlet 13b thereof with the interior of the casing 101 of the outlet nozzle 100. In turn, the interior of the suction tube 111 communicates with the interior of the hood 113; and the interior of the hood 113 selectively communicates with the interior of the lower portion of the casing 101 through the valve port 114 depending upon the position of the valve element 115a. More particularly, the valve element 115a occupies a normal lower open position with respect to the valve port 114 when the diaphragm 115 occupies its normal lower position, as illustrated in FIGS. 4 and 5. On the other hand, the valve element 115a occupies an operated upper closed position with respect to the valve port 114, as indicated in dotted lines in FIG. 4, when the diaphragm 115 occupies its actuated upper position. Also, as illustrated in FIGS. 4 and 5, when the valve element 115a occupies its open position with respect to the valve port 114, the bottom of the hood 113 is in open communication with the lower portion of the casing 101; and when the valve element 115a occupies its closed position with respect to the valve port 114, the communication between the bottom of the hood 113 and the interior of the casing 101 is cut-off or closed. Also, it will be understood that when the storage hopper 10 contains granular material, the same falls through the bottom discharge outlet 13b thereof into the casing 101 and accumulates upon the upper surfaces of the valve element 115a and the diaphragm proper element 115c; whereby the valve element 115a and the diaphragm proper element 115c are subject to the weight of granular material in the casing 101 so long as there is granular material in the storage hopper 10, thereby further to bias and to maintain the valve element 115a in its normal open position with respect to the valve port 114. As explained more fully hereinafter, the granular material from the storage hopper 10 is unloaded via the casing 101 of the outlet nozzle 100 through the suction tube 111, the granular material proceeding from the casing 101 through the valve port 114, with the valve element 115a in its open position, and thence through the hood 113 into the suction tube 111. Of course, it will be understood that in this unloading operation, suction is maintained in one end 112 of the suction tube 111 and conveying air is supplied at the other end 112 of the suction tube 111. After all of the granular material has been unloaded from the storage hopper 10 and from the casing 101 of the associated nozzle 100, continued suction in the suction tube 111 causes the valve element 115a to be operated from its lower open position with respect to the valve port 114 into its upper closed position with respect to the valve port 114 by virtue of a Bernoulli effect that is produced in the lower portion of the casing 101 and between the valve element 115a and the bottom of the hood 113 in the immediate area of the valve port 114, as explained more fully below. Accordingly, it will be understood that in response to suction in the suction tube 111 and the consequent suction in the lower portion of the casing 101, after all of the granular material in the storage hopper 10 has been unloaded therefrom, the valve element 115a is automatically operated by the diaphragm proper element 115c from its open position into its closed position with respect to the valve port 114, whereby the communication between the interior of the suction tube 111 and the interior of the casing 101 is cut-off or closed.

More particularly, in the absence of suction in the suction tube 111, concurrently with or without granular material in the lower portion of the casing 101, the upper side of the valve element 115a and the upper side of the diaphragm proper element 115c and the hole 115d in the diaphragm proper element 115c are subject to atmospheric pressure so that the chamber 117 disposed below the diaphragm 115 is also subject to atmospheric pressure, with the result that the diaphragm proper element 115c is maintained in its lower position maintaining the valve element 115a in its lower or open position with respect to the valve port 114. On the other hand, suction in the suction tube 111, concurrently with the presence of granular material in the lower portion of the casing 101, subjects the upper side of the valve element 115a and the upper side of the diaphragm proper element 115c and the hole 115d in the diaphragm proper element 115c to relatively low air pressure (substantially below atmospheric pressure) so that the chamber 117 is also subject to the relatively low air pressure, with the result that the diaphragm proper element 115c is maintained in its lower position maintaining the valve element 115a into its lower or open position with respect to the valve port 114. Still on the other hand, suction in the suction tube 111, concurrently with the absence of granular material in the lower portion of the casing 101, subjects the upper side of the valve element 115a to relatively low air pressure (substantially below atmospheric pressure), and subjects the upper side of the diaphragm proper element 115c and the hole 115d in the diaphragm proper element 115c to relatively high air pressure (only slightly below atmospheric pressure), so that the chamber 117 is also subject to the relatively high air pressure, with the result that the diaphragm proper element 115c is operated into its upper position moving the valve element 115a into its upper or closed position with respect to the valve port 114. Under the last-mentioned conditions, the upper side of the valve element 115a is subjected to the relatively low air pressure mentioned, while the upper side of the diaphragm proper element 115c is subjected to the relatively high air pressure mentioned by virtue of the Bernoulli effect as a consequence of the air rushing through the restricted orifice defined between the bottom of the hood 113 and the top side of the valve element 115a.

Moreover, the arrangement of the diaphragm proper element 115c not only constitutes mechanism for selectively actuating the valve element 115a between its open and closed positions with respect to the valve port 114, as described above, but the provision of the porous plug 118 in the hole 115d formed through the diaphragm proper element 115c serves as an air check valve preventing sudden movements of the diaphragm proper element 115c between its upper and lower positions, thereby to prevent flutter of the valve element 115a between its closed and open positions with respect to the valve port 114.

Also, it will be understood that the granular material in the storage hopper 10 may be directly unloaded by gravity through the bottom discharge opening 107 in the casing 101 by the removal of the bottom cover 108 from its normal closed position with respect to the bottom discharge outlet 107. More particularly, the bottom cover 108 may be removed from covering relation with respect to the bottom discharge opening 107 by removal of one of the nuts 110 from the associated one of the threaded studs 109 and by loosening of the other of the nuts 110 with respect to the associated other threaded stud 109, the bottom cover 108 being rotated about the retaining one of the threaded studs 109 from its covering position with respect to the bottom discharge opening 107. Of course, this gravity unloading of the storage hopper 10 through the casing 101 of the nozzle 100, with the bottom cover 108 in its open position, is altogether independent of the pneumatic unloading thereof utilizing the suction tube 111 in the manner previously explained. At this point, it is noted that the crest of the intermediate portion of the suction tube 111 extending longitudinally through the casing 101 of the nozzle 100 is provided with a general pyramidal configuration in lateral section, as indicated at 111a, so as to facilitate the downward slide of the granular material from the storage hopper 10 through the casing 101 and regardless of whether pneumatic unloading or gravity unloading of the granular material through the nozzle 100 is employed.

Further, the nozzle 100 comprises an air control tube 120 and an air bleeder tube 130, both carried by the bottom cover 108 and communicating with the chamber 117 disposed between the bottom cover 108 and the diaphragm 115. The air control tube 120 is selectively connectible to a source of relatively low pressure air and to a source of relatively high pressure air for the purpose of positively actuating the diaphragm 115 and of overriding the automatic facility for actuating the diaphragm 115, as described above. The outer end of the air bleeder tube 130 communicates with the atmosphere, and a porous plug 131 is arranged in the inner end of the air bleeder tube 130; which porous plug 131 may be of the general construction of the porous plug 118, as previously described.

When relatively high pressure air is connected to the air control tube 120, the same is admitted into the chamber 117, thereby to move the diaphragm 115 upwardly so as to force the valve element 115a into its closed position with respect to the associated valve port 114 and regardless of the conditions of air pressure in the casing 101 that normally automatically control the position of the diaphragm 115 as described above, whereby the valve element 115a is retained in its closed position and the previously described automatic facility for controlling the position of the valve element 115a is thus overridden. Some portion of the relatively high pressure air supplied into the chamber 117 constantly leaks through the porous plug 131 and via the air bleeder tube 130 back to the atmosphere. On the other hand, when relatively low pressure air is connected to the air control tube 120, the same effects the withdrawal of air from the chamber 117, thereby to move the diaphragm 115 downwardly so as to force the valve element 115a into its open position with respect to the associated valve port 114 and regardless of the conditions of air pressure in the casing 101 that normally automatically control the position of the diaphragm 115, as described above; whereby the valve element 115a is retained in its open position and the previously described automatic facility for controlling the position of the valve element 115a is thus overridden. At this time, a restricted amount of atmospheric air is supplied via the air bleeder tube 130 and through the porous plug 131 into the chamber 117 and thence into the air control tube 120.

Again referring to FIGS. 1 and 2, it will be observed that the air control tube 120A extending into the adjacent casing of the associated nozzle 100A is connected to a manifold section of pipe 121A extending between the associated opening valve 41A and the associated closing valve 42A, the valves 41A and 42A normally occupying their closed positions as previously noted. Similarly, the air control tube 120B extending into the adjacent casing of the associated nozzle 100B is connected to a manifold section of pipe 121B extending between the associated opening valve 41B and the associated closing valve 42B, the valves 41B and 42B normally occupying their closed positions as previously noted. Similarly, the air control tube 120C extending into the adjacent casing of the associated nozzle 100C is connected to a manifold section of pipe 121C extending between the associated opening valve 41C and the associated closing valve 42C, the valves 41C and 42C normally occupying their closed positions, as previously noted. Similarly, the air control tube 120D extending into the adjacent casing of the associated nozzle 100D is connected to a manifold section of pipe 121D extending between the associated opening valve 41D and the associated closing valve 42D, the valves 41D and 42D normally occupying their closed positions, as previously noted.

Considering now the general mode of operation of the storage system of FIGS. 1 and 2, and assuming that each of the hoppers 10A, 10B, 10C and 10D contains granular material, that the suction apparatus 20 is operating, that the pump 32 is operating, and that each of the keys K51A, K61B, K71C and K81D at the remote control station 50 occupies its automatic position. The operating suction apparatus 30 draws air thereinto through the common outlet conduit 20 and discharges the same through the discharge conduit 31, whereby low pressure is drawn in the two parallel connected outlet conduits 19 and 29. Accordingly, atmospheric air is drawn into the air inlet conduit 17 and passes through the filter 16 into the air outlet conduit 15 and through the air control valve 14 into the suction tube in the associated nozzle 100A. The air passes through the suction tube of the nozzle 100A and thence via the conduit 18 and through the suction tube of the nozzle 100B into the outlet conduit 19; which stream of air passing through the nozzles 100A and 100B may be regulated as required by the manually operable air control valve 14 so that the granular material in the hopper 10A is fed through the associated nozzle 100A into the air stream mentioned and so that the granular material in the hopper 10B is fed through the associated nozzle 100B into the air stream mentioned, with the result that the granular material carried by the air stream mentioned into the outlet conduit 19 is derived from the two hoppers 10A and 10B. Similarly, atmospheric air is drawn into the air inlet conduit 27 and passes through the filter 26 into the air outlet conduit 25 and through the air control valve 24 into the suction tube in the associated nozzle 100C. The air passes through the suction tube of the nozzle 100C and thence via the conduit 28 and through the suction tube of the nozzle 100D into the outlet conduit 29; which stream of air passing through the nozzles 100C and 100D may be regulated as required by the manually operable air control valve 24 so that the granular material in the hopper 10C is fed through the associated nozzle 100C into the air stream mentioned and so that the granular material in the hopper 10D is fed through the associated nozzle 100D into the air stream mentioned, with the result that the granular material carried by the air stream mentioned into the outlet conduit 29 is derived from the two hoppers 10C and 10D. The two air streams mentioned respectively passing through the outlet conduits 19 and 29 are combined in the conduit 20 and thus pass through the suction apparatus 30 into the discharge conduit 31, whereby the granular material in the air stream passing through the discharge conduit 31 is derived from the four hoppers 10A, 10B, 10C and 10D. Of course, in the event it is desirable to arrest the supply of granular material through the discharge conduit 31, it is only necessary to arrest operation of the suction apparatus 30.

During the normal operation of the storage apparatus as described above, should any one of the hoppers 10A, etc., become empty with respect to the granular material normally contained therein, the associated nozzle 100A, etc., is automatically operated to cut-off the normally open communication between the casing thereof and the suction tube thereof, in the manner previously explained in conjunction with the operation of the nozzle 100 in connection with FIGS. 4 to 6, inclusive. Of course, this automatic control of the nozzle 100A, etc., prevents undesirable passage of air through the associated hopper 10A, etc., when the same is empty with respect to the granular material normally contained therein.

Now assuming that it is desirable for some reason to upset the normal automatic operation of the storage system as described above with respect to one of the hoppers 10A, etc., this can be accomplished by the operator at the remote control station 50 by appropriate operation of the corresponding one of the control keys K51A, etc.

First assuming that the operator at the remote control station 50 desired to upset the normal automatic operation of the nozzle 100B individually associated with the hopper 10B in the sense that it is desired to force the valve mechanism of the nozzle 100B into its open position and without refernce to whether there is granular material contained in the associated hopper 10B, the operator merely actuates the corresponding control key K61B out of its "automatic" position into its "open" position. Operation of the key K61B into its "open" position engages the switch spring 62 with the switch spring 64 so that potential appearing upon the conductor 90 from the associated battery 91 is connected to the conductor 65 in the cable 95, thereby to complete an obvious circuit for energizing the solenoid of the opening valve 41B so that the same is operated into its open position connecting the low pressure pipe 37 to the manifold pipe 121B and consequently to the air control tube 120B in order to effect operation of the valve mechanism incorporated in the nozzle 100B into its open position in the manner previously explained. The control key K61B is locked in its "open" position, thereby to maintain the valve mechanism incorporated in the nozzle 100B in its open position; with the result that operation of the suction apparatus 30 at this time necessarily effects emptying of the granular material from the hopper 10B. When the operator at the remote control station 50 desires to restore the nozzle 100B individual to the hopper 10B back to automatic operation, he merely returns the corresponding control key K61B from its "open" position back into its "automatic" position, whereby the previously traced circuit for energizing the solenoid of the opening valve 41B is interrupted, so that the low pressure pipe 37 is disconnected from the manifold pipe 121B and consequently from the air control tube 120B; whereby the valve mechanism incorporated in the nozzle 100B is restored to its normal automatic operation as previously described.

Next assuming that the operator at the remote control station 50 desires to upset the normal automatic operation of the nozzle 100B individually associated with the hopper 10B in the sense that it is desired to force the valve mechanism of the nozzle 100B into its closed position and without reference to whether there is granular material contained in the associated hopper 10B, the operator merely actuates the corresponding control key K61B out of its "automatic" position into its "closed" position. Operation of the key K61B into its "closed" position engages the switch spring 62 with the switch spring 63 so that the potential appearing upon the conductor 90 from the associated battery 91 is connected to the conductor 66 in the cable 95, thereby to complete an obvious circuit for energizing the solenoid of the closing valve 42B so that the same is operated into its open position connecting the high pressure pipe 38 to the manifold pipe 121B and consequently to the air control tube 120B in order to effect operation of the valve mechanism incorporated in the nozzle 100B into its closed position, in the manner previously explained. The control key K61B is locked in its "closed" position, thereby to maintain the valve mechanism incorporated in the nozzle 100B in its closed position; with the result that operation of the suction apparatus 30 at this time cannot effect emptying of the granular material from the hopper 10B. When the operator at the remote control station 50 desired to restore the nozzle 100B individual to the hopper 10B back to automatic operation, he actuates the corresponding control key K61B from its "closed" position into its "open" position and then back into its "automatic" position. Operation of the control key K61B from its "closed" position interrupts the previously traced circuit for energizing the solenoid of the closing valve 42B, so that the high pressure pipe 38 is disconnected from the manifold pipe 121B and consequently from the air control tube 20B; while operation of the control key K61B into its "open" position completes the previously traced circuit for energizing the solenoid of the opening valve 41B, so that the low pressure pipe 37 is connected to the manifold pipe 121B and consequently to the air control tube 120B; with the result that the valve mechanism incorporated in the nozzle 100B is operated from its closed position into its open position in the manner previously explained. The operation of the control key K61B from its "open"

position back into its "automatic" position interrupts the previously traced circuit for energizing the solenoid of the opening valve 41B, so that the low pressure pipe 37 is disconnected from the manifold pipe 121B and consequently from the air control tube 120B; whereby the valve mechanism incorporated in the nozzle 100B is restored to its normal automatic operation, as previously described.

In view of the foregoing explanation of the mode of selectively controlling the position of the valve mechanism incorporated in the nozzle 100B individual to the hopper 10B, utilizing the corresponding key K61B at the remote control station 50, it will be understood that, likewise, the position of the valve mechanism incorporated in any one of the other nozzles 100A, etc., may be controlled utilizing the corresponding key K51A, etc., at the remote control station 50. Hence, it will be understood that the connection and the disconnection of each of the four hoppers 10A, 10B, 10C and 10D may then be controlled entirely upon a manual basis with the utilization of the corresponding keys K51A, K61B, K71C, and K81D at the remote control station 50, thereby rendering the emptying of the four hoppers mentioned entirely under the control of the operator at the remote control station 50.

In view of the foregoing, it is apparent that there has been provided in an apparatus for storing granular material and including structure defining a plurality of storage hoppers, an improved arrangement for selectively controlling either automatically or manually the emptying of granular material from the various ones of the hoppers mentioned.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In apparatus for storing granular material, structure defining a plurality of storage hoppers respectively provided with a plurality of bottom discharge outlets, a plurality of outlet nozzles respectively carried by said storage hoppers, each of said outlet nozzles including a casing disposed below the bottom outlet in the associated one of said storage hoppers and communicating therewith, each of said outlet nozzles also including a suction tube extending through the lower portion of the associated casing for unloading the granular material from the associated one of said storage hoppers, the intermediate section of each of said tubes being disposed within the associated casing and having a valve port provided in the bottom thereof and communicating with the lower portion of the associated casing, each of said outlet nozzles further including a valve element arranged in the bottom of the associated casing and disposed below the valve port in the associated tube and cooperating therewith, whereby the interior of each of said tubes is in communication with the lower portion of the associated casing when the associated valve element occupies its open position with respect to the associated valve port and the interior of each of said tubes is cut-off from communication with the lower portion of the associated casing when the associated valve element occupies its closed position with respect to the associated valve port, each of said outlet nozzles further including actuating mechanism for selectively actuating the associated valve element between its open and closed positions with respect to the associated valve port, an outlet pipe, a conduit system commonly connecting said tubes to said outlet pipe, means for producing suction in said outlet pipe, whereby conveying air is supplied through said conduit system and via said tubes into said outlet pipe with the result that the granular material in said plurality of storage hoppers is selectively unloaded therefrom through said respective casings into said respective tubes depending upon the respective positions of the respective valve elements in the corresponding ones of said outlet nozzles, each of said actuating mechanisms being normally responsive to the passage of conveying air through the associated tube concurrently with the presence of granular material in the associated casing for actuating the associated valve element into its open position with respect to the associated valve port and normally responsive to the passage of conveying air through the associated tube concurrently with the absence of granular material in the associated casing for actuating the associated valve element into its closed position with respect to the associated valve port, a control station remote from said outlet nozzles and provided with a plurality of control devices respectively corresponding thereto, each of said control devices including normal and open and closed control positions, means controlled by operation of any one of said control devices from its normal position into its open position for overriding the normal response of the actuating mechanism in the corresponding one of said outlet nozzles and for positively operating the same to actuate the associated valve element into its open position with respect to the associated valve port, and means controlled by operation of any one of said control devices from its normal position into its closed position for overriding the normal response of the actuating mechanism in the corresponding one of said outlet nozzles and for positively operating the same to actuate the associated valve element into its closed position with respect to the associated valve port.

2. The apparatus set forth in claim 1, wherein a plurality of said tubes are connected in series relation with each other in said conduit system to said outlet pipe.

3. The apparatus set forth in claim 1, wherein a plurality of said tubes are connected in parallel relation with each other in said conduit system to said outlet pipe.

4. In apparatus for storing granular material including structure defining a storage hopper provided with a bottom discharge outlet; an outlet nozzle comprising a casing carried by said storage hopper and disposed below said bottom outlet and communicating therewith, a suction tube extending through the lower portion of said casing for unloading the granular material from said storage hopper through said casing, one end of said tube providing an air inlet opening thereinto and the other end of said tube providing an air outlet opening therefrom, the intermediate section of said tube being disposed within said casing and having a valve port provided in the bottom thereof, a valve element arranged in the lower portion of said casing below said valve port and cooperating therewith, whereby the interior of said tube is in communication with the lower portion of said casing when said valve element occupies its open position with respect to said valve port and the interior of said tube is cut-off from communication with the lower portion of said casing when said valve element occupies its closed position with respect to said valve port, actuating mechanism for selectively actuating said valve element between its open and closed positions with respect to said valve port, means for producing suction in the other end of said tube, whereby conveying air is supplied into said air inlet opening and passes through said tube and out of said air outlet opening with the result that the granular material in said storage hopper is selectively unloaded therefrom through said casing depending upon the position of said valve element with respect to said valve port, said mechanism comprising a diaphragm arranged in the lower portion of said casing and operatively connected to said valve element, said diaphragm having a lower position actuating said valve element into its open position with respect to said valve port and an upper position actuating said valve element into its closed position with respect to said valve port, said diaphragm cooperating with the bottom of said casing to define a chamber therebetween, said diaphragm being normally responsive to the passage of conveying air through said tube concurrently with the presence of granular material in said casing to move into its lower position and normally responsive to the passage of conveying air through said tube concurrently with the absence of granular material in said casing to move into its upper position, a low pressure line, a high pressure line, valve means for selectively connecting said lines to said chamber, whereby said diaphragm is moved into its lower position in response to connection of said low pressure line to said chamber and is moved into its upper position in response to connection of said high pressure line to said chamber, a control station removed from said outlet nozzle and provided with a control device having normal and open and closed positions, means responsive to operation of said control device from its normal position into its open position for operating said valve means to connect said low pressure line to said chamber so as to override the normal response of said diaphragm in said outlet nozzle and for positively moving the same into its lower position, and means responsive to operation of said control device from its normal position into its closed position for operating said valve means to connect said high pressure line to said chamber so as to override the normal response of said diaphragm in said outlet nozzle and for positively moving the same into its upper position.

5. The apparatus set forth in claim 4, and further comprising means defining a restricted passage between said chamber and the atmosphere, whereby air is bled through said passage at a low controlled rate from said chamber to the atmosphere when said high pressure line is connected to said chamber, and whereby air is bled through said passage at a low controlled rate from the atmosphere into said chamber when said low pressure line is connected to said chamber.

References Cited in the file of this patent
UNITED STATES PATENTS

| | | |
|---|---|---|
| 2,325,432 | Simpson | July 27, 1943 |
| 2,706,136 | Hughes | Apr. 12, 1955 |
| 2,707,132 | Baresch | Apr. 26, 1955 |
| 2,776,171 | Mylting | Jan. 1, 1957 |